(12) United States Patent
Abe

(10) Patent No.: US 8,151,847 B2
(45) Date of Patent: Apr. 10, 2012

(54) PNEUMATIC TIRE

(75) Inventor: Akihiko Abe, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 1168 days.

(21) Appl. No.: 11/915,823

(22) PCT Filed: May 31, 2006

(86) PCT No.: PCT/JP2006/310893
§ 371 (c)(1),
(2), (4) Date: Nov. 28, 2007

(87) PCT Pub. No.: WO2006/129721
PCT Pub. Date: Dec. 7, 2006

(65) Prior Publication Data
US 2009/0101265 A1   Apr. 23, 2009

(30) Foreign Application Priority Data

May 31, 2005   (JP) .................................. 2005-160653

(51) Int. Cl.
*B60C 3/00*   (2006.01)
*B60C 3/04*   (2006.01)
*B60C 9/28*   (2006.01)

(52) U.S. Cl. ..................... 152/454; 152/209.14; 152/538
(58) Field of Classification Search ............. 152/209.14, 152/454, 538
See application file for complete search history.

(56) References Cited

U.S. PATENT DOCUMENTS

| | | | | |
|---|---|---|---|---|
| 1,921,772 | A | * | 8/1933 | Paull .......................... 152/454 X |
| 2,884,040 | A | * | 4/1959 | Noel Saint-Frison Louis Henri et al. .......................... 152/538 X |
| 4,194,548 | A | * | 3/1980 | Roger ....................... 152/538 X |
| 4,203,480 | A | * | 5/1980 | Peter et al. ................ 152/454 X |
| 4,706,724 | A | * | 11/1987 | Ohkuni et al. ................ 152/454 |
| 4,947,915 | A | * | 8/1990 | Panikkar et al. .......... 152/538 X |
| 5,247,979 | A | * | 9/1993 | Asano ....................... 152/209.14 |
| 5,441,093 | A | * | 8/1995 | Shirasyouji et al. .......... 152/454 |
| 5,630,892 | A | * | 5/1997 | Williams et al. .......... 152/209.14 |
| 5,630,893 | A | | 5/1997 | Williams et al. |
| 6,491,077 | B1 | * | 12/2002 | Lopez et al. ................... 152/454 |
| 6,499,521 | B2 | * | 12/2002 | Girault et al. ................. 152/454 |
| 7,441,576 | B2 | * | 10/2008 | Yamanaka ................ 152/538 X |

FOREIGN PATENT DOCUMENTS

| | | |
|---|---|---|
| JP | 57-209404 A | 12/1982 |
| JP | 08-025906 A | 1/1996 |
| JP | 08-337101 A | 12/1996 |
| JP | 2000-016015 A | 1/2000 |

(Continued)

*Primary Examiner* — Adrienne C. Johnstone
(74) *Attorney, Agent, or Firm* — Sughrue Mion, PLLC

(57) ABSTRACT

A pneumatic tire including a tread part contacting a road surface, at least two belt layers each formed of a plurality of parallel cords covered with rubber, and a pair of bead toes. An angle at which the line segment BQ and the line segment SW cross is 50° or smaller when, in a cross section including the axis of rotation: the ends of a shortest belt layer, which is the shortest one, in length in a tire width direction, of the belt layers are set to be points B; points on a tire surface, between which the width of the tire is the widest, are set to be points Q; a line segment connecting each point B and the corresponding one of the points Q is set to be a line segment BQ; and a line segment connecting the pair of points Q is set to be a line segment SW.

7 Claims, 7 Drawing Sheets

FOREIGN PATENT DOCUMENTS

| | | |
|---|---|---|
| JP | 2002-205513 A | 7/2002 |
| JP | 2003-080906 A | 3/2003 |
| JP | 2006-001360 A | 1/2006 |
| WO | WO-2004/103736 A1 * | 12/2004 |

* cited by examiner

COMPARATIVE ART

PNEUMATIC TIRE

TECHNICAL FIELD

The present invention relates to a pneumatic tire including: a tread part, which contacts a road surface; at least two belt layers each including a plurality of parallel cords covered with rubber; and a pair of bead toes.

BACKGROUND ART

Heretofore, a pneumatic tire which has reduced rolling resistance has been developed (for example, refer to Patent Document 1).

As a method of reducing rolling resistance, devised, in recent years, have been a method by reducing the tan δ of rubber used for a tread part, a method by making a gauge of a tread part shallow to the limit, and the like (for example, Japanese Patent Application Laid-open Publication No. 2002-205513).

DISCLOSURE OF THE INVENTION

However, when the method by reducing the tan δ of rubber used for a tread part is employed, a problem arises that the wear resistance may be reduced.

In addition, when the method by making a gauge of a tread part shallow to the limit is employed, a problem arises that the durability and wear resistance of a tread part may be reduced.

Hence, in view of the above-mentioned problems, an object of the present invention is to provide a pneumatic tire in which the rolling resistance can be reduced without reducing the wear resistance and durability.

In order to solve the above problems, a first aspect of the present invention provides a pneumatic tire including a tread part contacting a road surface, at least two belt layers each formed of a plurality of parallel cords covered with rubber, and a pair of bead toes. The pneumatic tire is characterized in that an angle at which the line segment BQ and the line segment SW cross is 50° or smaller when, in a cross section including the axis of rotation: the ends of a shortest belt layer, which is the shortest one, in length in a tire width direction, of the belt layers are set to be points B; points on a tire surface, between which the width of the tire is the widest, are set to be points Q; a line segment connecting each point B and the corresponding one of the points Q is set to be a line segment BQ; and a line segment connecting the pair of points Q is set to be a line segment SW.

With the aspect, it is possible to reduce the rolling resistance without reducing the wear resistance and the durability.

Specifically, rolling resistance is mostly caused by the energy loss due to deformation of rubber forming the tread part. It is known that the energy loss due to deformation of rubber forming the tread part is, in the vicinity of the tire equator line of the tread part, largely because of shear deformation in the tire circumference direction, and is, in the vicinity of an end of the tread part, largely because of shear deformation in the tire width direction. In other words, it is effective, in the vicinity of the tire equator line of the tread part, to reduce shear deformation in the tire circumference direction, and is effective, in the vicinity of an end of the tread part, to reduce shear deformation in the tire width direction.

Here, first, in order to reduce the shear deformation in the tire circumference direction in the vicinity of the tire equator line of the tread part, it is effective to improve the bending stiffness in the tire circumference direction in the tread part, and to reduce the energy loss due to deformation caused by the shear deformation resulting from the bending deformation. In view of this, as the present invention, when, in a cross section including the axis of rotation: the ends of a shortest belt layer in a tire width direction are set to be points B; points on a tire surface, between which the width of the tire is the widest, are set to be points Q; a line segment connecting each point B and the corresponding one of the points Q is set to be a line segment BQ; and a line segment connecting the pair of points Q is set to be a line segment SW, an angle at which the line segment BQ and the line segment SW can be set 50° or smaller, that is, smaller than a conventional angle. In this manner, it is possible to narrow the cord crossing width of the belt layer which is formed of at least two layers. Consequently, compared with a conventional tire, it is possible to reduce the energy loss due to deformation in the vicinity of the tire equator line of the tread part caused by the shear deformation in the tire circumference direction, thereby to reduce the rolling resistance, by making it possible to have larger deformation of a shoulder part, which is between the tread part and the sidewall parts, and by increasing the amount of distortion in the tire. Additionally, it is possible to reduce the rolling resistance without reducing the durability and the wear resistance by use of such a shape, unlike the cases of using a method by reducing tan δ of rubber used for a tread part, a method by making a gauge of a tread part shallow to the limit, and the like.

A second aspect of the present invention is that the angle at which the line segment BQ and the line segment SW cross is within a range of 20° to 40°.

A third aspect of the present invention is that when, in the cross section, a straight line extending parallel with the line segment BQ with a distance, on the outer side in the radial direction of the tire, equal to the tire width in the radial direction of the tire on the tire equator line is set to be a straight line BQ2, the outer contour line of the tire is positioned in the inner side in the radial direction of the tire than the straight line BQ2. With the aspect, it is possible to thin the part of the pneumatic tire positioned on the outer side in the radial direction of the tire than the straight line BQ, since the outer contour line is positioned on the inner side in the radial direction of the tire than the straight line BQ2. Consequently, it is possible to increase the eccentricity of the tread part in the vicinity of the tire equator line, so that it is possible to more effectively reduce the shear deformation in the tire circumference direction in the vicinity of the tire equator line of the tread part.

Furthermore, by designing the present invention to have the above structure, the part of the pneumatic tire positioned on the outer side in the radial direction of the tire than the straight line BQ is deformed at the time of loading, but the belt layer is not disposed on the place. Hence, it is possible to reduce the energy loss due to deformation caused by the shear deformation in the tire width direction resulting from the shrinkage of the belt layer in the tire width direction.

A fourth aspect of the present invention is that, in the cross section, the length of a line segment extending, parallel with the tire equator line, from the point B to the tread surface is 85% or less of the length from the shortest belt layer to the tread surface on the tire equator line. With this aspect, in the cross section, the length of the line segment extending, parallel with the tire equator line, from the point B to the tread surface is 85% or less of the length from the shortest belt layer to the tread surface on the tire equator line, that is, the vicinities of the ends of the tread part are thinner than the vicinity of the tire equator line of the tread part. Thus, it is possible to improve the stiffness in the tire width direction in the vicinities of the ends of the tread part, so that it is possible to more effectively reduce the shear deformation in the tire width direction. Moreover, as described above, the vicinities of the ends of the tread part are made thin. Consequently, the eccentricity of the tread part in the vicinity of the tire equator line is increased more, so that it is possible to more effectively reduce the shear deformation in the tire circumference direction in the vicinity of the tire equator line of the tread part.

A fifth aspect of the present invention is that when, in the cross section: a line segment extending, parallel with the tire equator line, from each point B to the tread surface, is set to be a line segment GB; and a line segment from the shortest belt layer to the tread surface on the tire equator line is set to be a line segment GA, the length of the line segment GB is 50% or more of the line segment GA.

A sixth aspect of the present invention is that when, in the cross section: a straight line extending parallel with the line segment SW through the bead toes is set to be a straight line M; and a line segment on the tire equator line extending, parallel with the tire equator line, from the tread surface to the straight line M, is set to be a line segment SH, the length of the line segment extending, parallel with the tire equator line, from each point Q to the straight line M is 55% or less of the length of the line segment SH. With the aspect, it is possible to prevent the sidewall parts from contacting a road surface in a large rudder angle range, since the length of the line segment extending, parallel with the tire equator line, from the point Q to the straight line M is 55% or less of the length of the line segment SH.

A seventh aspect of the present invention is that when, in the cross section: positions on the line segment SW, with a length of 80% of the line segment SW in between, and taking the tire equator line as the center in between, are set to be a point K; and a line segment, extending on the tire equator line, parallel with the tire equator line, from the tread surface to the straight line M, is set to be a line segment SH, the length of the line segment extending, through the points K, in parallel with the tire equator line, from the tread surface to the straight line M, is 85% or less of the length of the line segment SH. With the aspect, since the length of the line segment extending through the points K, in parallel with the tire equator line, from the tread surface to the straight line M, is 85% or less of the length of the line segment SH, it is possible to set the position of the vicinities of the ends of the tread part on the inner side in the radial direction of the tire than the conventional tire, so that it is possible to narrow the cord crossing width of the belt layer. Consequently, since the deformation of the shoulder part is largely deformed, and the amount of distortion of the tire is increased, compared with the conventional tire, it is possible to reduce the energy loss due to deformation caused by the shear deformation in the tire circumference direction in the vicinity of the tire equator line of the tread part, thereby to reduce the rolling resistance.

An eighth aspect of the present invention is that, in the cross section, the outer contour line of the tire and the inner contour line of the tire in a region from the tire equator line to the point B are approximately parallel with the line segment SW. A ninth aspect of the present invention is that, a difference in length in the radial direction of the tire between the position where the length in the radial direction of the tire is longest and the position where the length in the radial direction of the tire is shortest is 50% or less of the length from the shortest belt layer to the tread surface on the tire equator line, in an upper region which is a region between the contours of the tire outer and inner rims in the cross section. When the inner surface of the pneumatic tire is round, the contact shape is one where only the vicinity of the tire equator line of the tread part contacts a road surface. Accordingly, wear in the vicinity of the tire equator line of the tread part results in being increased compared to the vicinities of the ends of the tread part. Hence, the outer contour line of the tire and the inner contour line of the tire are made to be approximately parallel with the line segment SW, and the difference in length in the radial direction of the tire in the upper region between the position where the length in the radial direction of the tire is longest and the position where the length in the radial direction of the tire is shortest is set to be 50% or less of the length from the shortest belt layer to the tread surface on the tire equator line. In this manner, the inner surface of the pneumatic tire is made to be flat, and the contact shape is thus optimized. Hence, it is possible to make the wear in the tread part uniform.

A tenth aspect of the present invention is that the pneumatic tire further includes reinforcing layers each of which extends, in the cross section, to the vicinity of the line segment SW, from a position in the inner side in the tire width direction than an edge of the one longest one, in length in the tire width direction, of the belt layers, and each of which is disposed on the inner side in the radial direction of the tire than one of the belt layers on the innermost side in the radial direction of the tire. With this aspect, since the reinforcing layer which extends, in the cross section, to the vicinity of the line segment SW, from a position in the inner side in the tire width direction than an edge of the longest one, in length in the tire width direction, of the belt layers, and which is disposed on the inner side in the radial direction of the tire than one of the belt layers on the innermost side in the radial direction of the tire, is further included, it is possible to make it difficult for the tire to be punctured even if the shoulder part runs on a nail the like. Additionally, it is possible to sufficiently secure the stiffness of the shoulder part, even if the shoulder part in a large rudder angle range and the like contact a road surface.

An eleventh aspect of the present invention is that when, in the cross section: an acute angle at which the cords forming the longest one, in length in the tire width direction, of the belt layers incline in relation to the tire equator line, is set to be an angle $\theta 1$; and an acute angle at which the cords forming the shortest belt layer incline in relation to the tire equator line is set to be an angle $\theta 2$, the angle $\theta 1$ is larger than the angle $\theta 2$. With this aspect, since, as described above, the cord crossing width of the belt layer is narrow, and the angle $\theta 1$ is larger than the angle $\theta 2$, the belt tension is focused on the vicinity of the tire equator line of the tread part. Hence, it is possible to improve the bending stiffness in the tire circumference direction in the vicinity of the tire equator line of the tread part, thereby to suppress deformation in the tire circumference direction in the vicinity of the tire equator line of the tread part.

BEST MODES FOR CARRYING OUT THE INVENTION

First Embodiment

Descriptions will be given below of a pneumatic tire 1 according to an embodiment.

Figure 1:
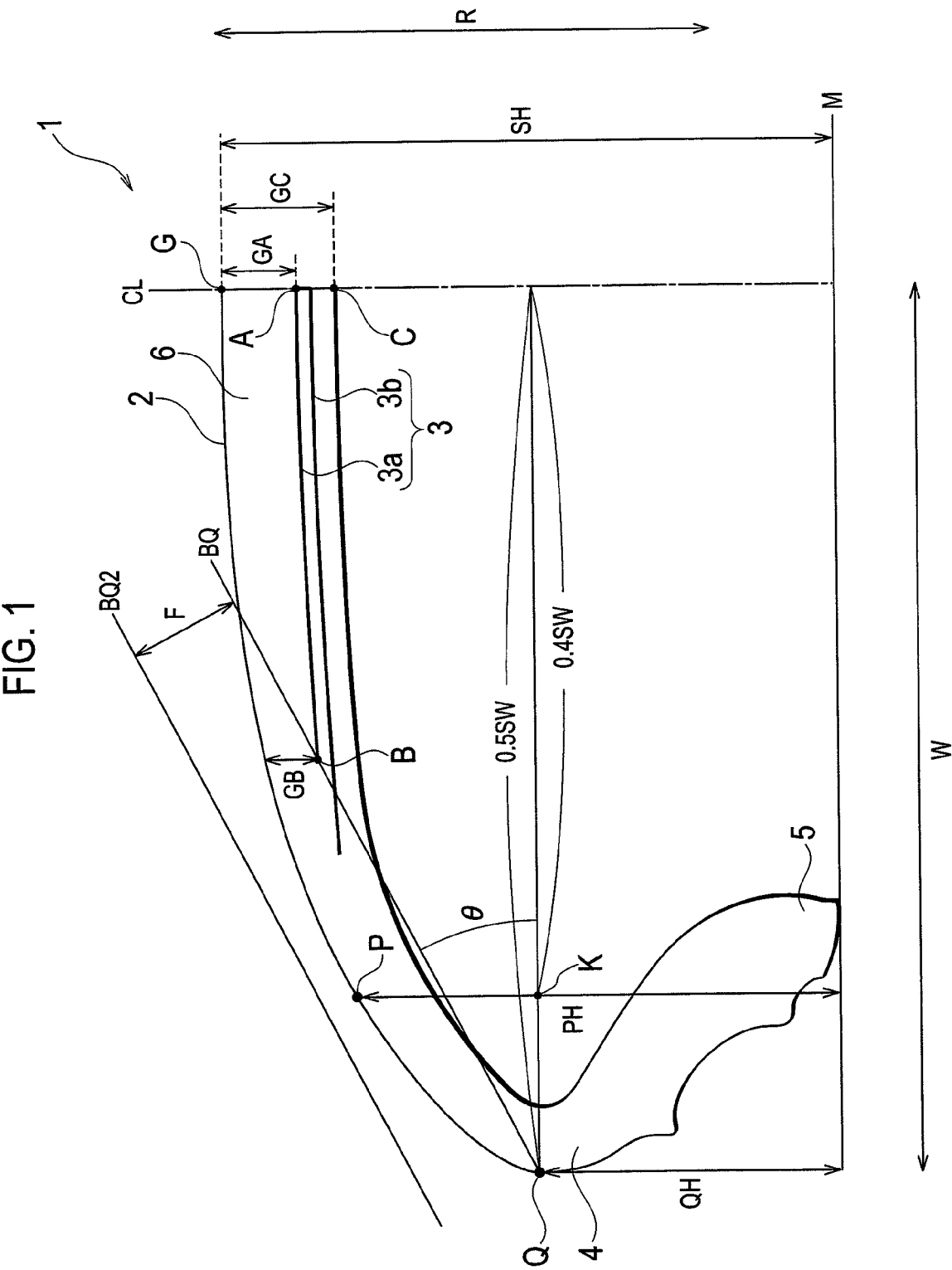
FIG. 1 is a cross-sectional view showing a pneumatic tire according to an embodiment of the present invention.

FIG. 1 is a cross-sectional view showing a pneumatic tire according to the present embodiment. Please note that the drawing shows only one side of the pneumatic tire 1 from the tire equator line CL.

As shown in the drawing, the pneumatic tire 1 includes a tread part 2, belt layers 3, sidewall parts 4, and bead toes 5.

The tread part 2 is a thick rubber layer which contacts a road surface, and is for protecting the belt layers 3 to be described later and the like.

Each of the belt layers 3 is formed of a plurality of parallel cords covered with rubber, and is disposed on the inner side of the tread part 2 in the radial direction of the tire (an arrow R direction). Here, the belt layers 3 include at least two layers, a shortest belt layer 3a, the length of which in the tire width direction W is shortest, and a longest belt layer 3b, the length of which in the tire width direction W is longest.

In the drawing, the shortest belt layer 3a is disposed on the outer side in the radial direction of the tire than the longest belt layer 3b. However, the disposition is not limited to this, and may be reversed.

The sidewall parts 4 are a pair of wall surfaces which are formed at both ends of the tread part 2 in the tire width direction (an arrow W direction).

The bead toes 5 are innermost parts of a pair of bead parts in the radial direction R of the tire, the bead parts being for fixing the pneumatic tire 1 to a rim (unillustrated).

Assume a case that, in the pneumatic tire 1, the ends of the shortest belt layer 3a in the tire width direction are indicated as points B, points on a tire surface, between which the width of the tire is widest, are indicated as points Q, a line segment which connects each point B and the corresponding one of the points Q is indicated as a line segment BQ, and a line segment which connects a pair of points Q is indicated as a line segment SW, as shown in the drawing. In such a case, an angle (an angle θ in the drawing) formed by crossing the line segment BQ and the line segment SW is 50° or smaller.

Figure 2:
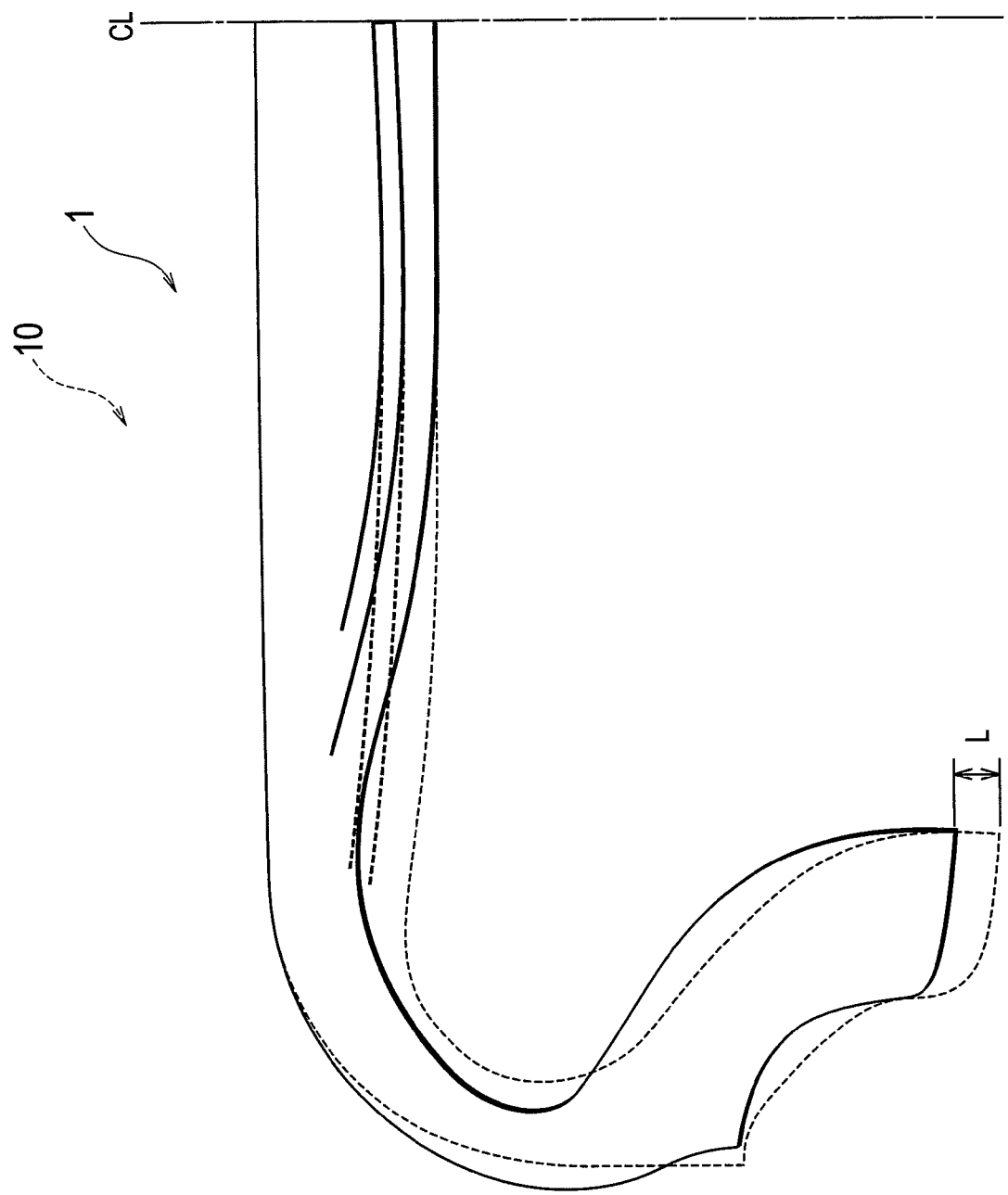
FIG. 2 is a cross-sectional view showing a comparison between the pneumatic tire according to the embodiment of the present invention and a conventional pneumatic tire.

Since the angle θ is 50° or smaller, that is, smaller than a conventional angle, the cord crossing width of the belt layer 3 including the two layers can be narrower. Accordingly, as shown in FIG. 2, the pneumatic tire 1 of the present invention is largely deformed in the vicinity of an end of the tread part compared with a conventional pneumatic tire 10, leading to an increase in the amount of distortion (distortion L in the drawing) of the pneumatic tire 1. This can reduce energy loss due to distortion caused by shear deformation in the tire circumference direction in the vicinity of the tire equator line CL of the tread part 2, and thereby the rolling resistance can be reduced.

Figure 3:
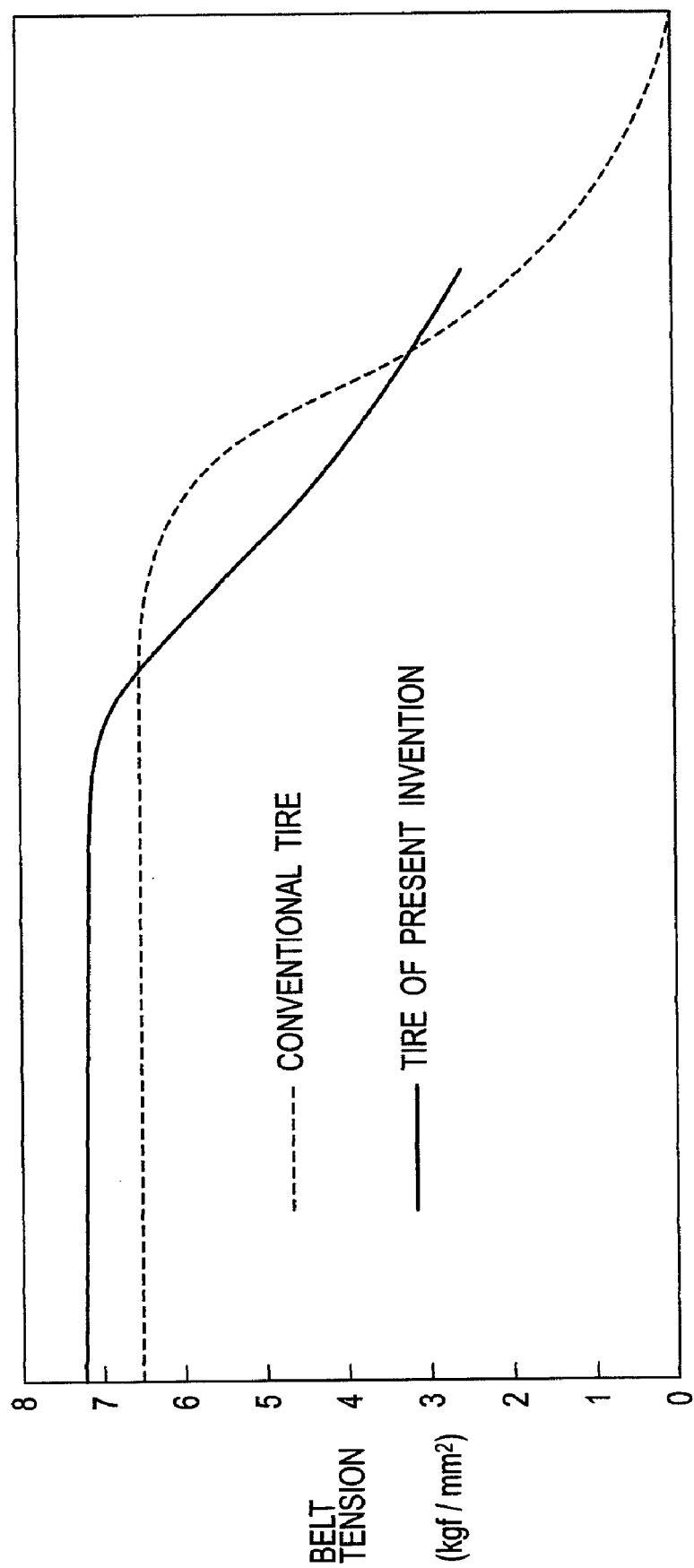
FIG. 3 is a graph showing the belt cord tension of the pneumatic tire according to the embodiment of the present invention.

Moreover, since the cord crossing width of the belt layers 3 including the two layers is narrower, the belt cord tension is focused on the vicinity of the tire equator line CL of the tread part 2 as shown in FIG. 3. Hence, it is possible to minimize the deformation in the tire circumference direction in the vicinity of the tire equator line CL of the tread part 2 compared with the conventional pneumatic tire 10.

Here, the tire maximum width position is a position where the length in the tire width direction is longest in the pneumatic tire 1.

Here, the angle θ is preferably 20° or larger. If the angle θ is smaller than 20°, the belt cord crossing width becomes too narrow, and hence, a problem arises that the operation stability and the wear resistance are deteriorated.

Additionally, when a straight line BQ2 denotes a straight line which extends, on the outer side in the radial direction of the tire, parallel with the line segment BQ at a distance equal to the width of the tire equator line CL in the radial direction of the tire, the outer contour line of the tire is positioned on the inner side in the radial direction of the tire than the straight line BQ2.

Incidentally, the angle θ is preferably within the range of 20° to 40°, and more preferably within a range of 20° to 35°.

Here, the distance equal to the width of the tire equator line CL in the radial direction of the tire is indicated as GC in the drawing, and this GC has the same width as F.

Furthermore, the length of a line segment extending parallel with the tire equator line CL from the point B to the tread surface is 85% or less of a length from the shortest belt layer 3a to the tread surface on the tire equator line CL.

Here, the line segment extending parallel with the tire equator line CL from the point B to the tread surface is indicated as GB in the drawing, and the length from the shortest belt layer 3a to the tread surface on the tire equator line CL is indicated as GA in the drawing.

Incidentally, the length of GB is preferably 50% or more of the length of GA in the radial direction of the tire. If the length of GB is shorter than 50% of the length of GA in the radial direction of the tire, a problem arises that the wear resistance of a shoulder part is deteriorated.

Moreover, assume a case where a straight line extending, through the bead toes 5, parallel with the line segment SW indicates a straight line M, and where a line segment extending from the tread surface to the straight line M, and parallel with the tire equator line CL indicates a line segment SH. In such a case, the length of a line segment extending parallel with the tire equator line CL from the point Q to the straight line M is 55% or less of the length of the line segment SH.

Here, the line segment extending parallel with the tire equator line CL from the point Q to the straight line M is indicated as QH in the drawing.

Incidentally, the length of QH is preferably 30% or more of the length of the line segment SH. If the length of QH is shorter than 30% of the length of the line segment SH, a problem arises that the rim fit is deteriorated.

Figure 4:
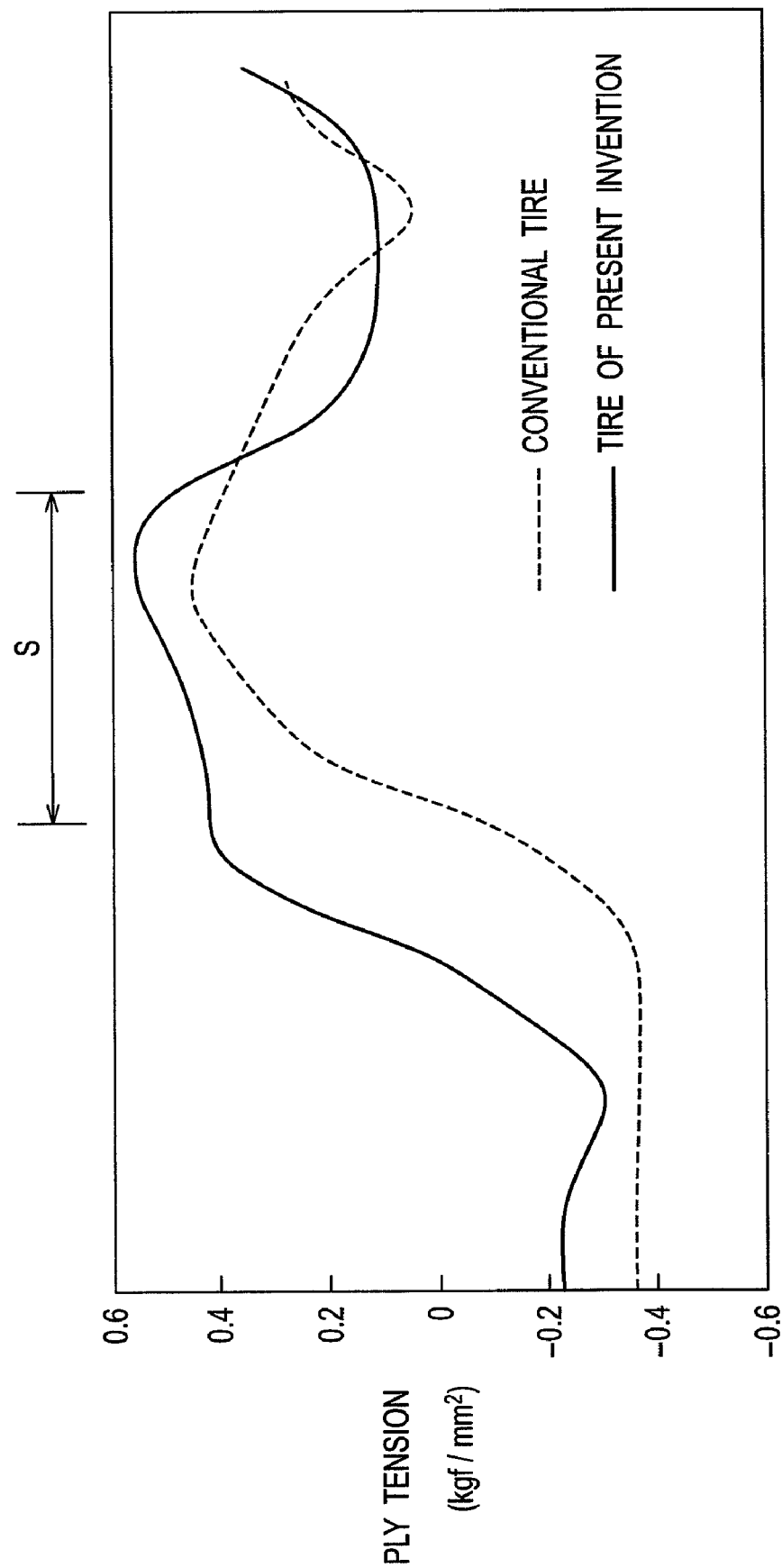
FIG. 4 is a graph showing the ply tension of the pneumatic tire according to the embodiment of the present invention.

Here, the length of the line segment extending parallel with the tire equator line CL from the point B to the tread surface is 85% or less of the length from the shortest belt layer 3a to the tread surface on the equator line CL. Moreover, the length of the line segment extending, parallel with the tire equator line CL, from each point Q to the straight line M is 55% or less of the length of the line segment SH. With this, the radius of curvature of a carcass line from the vicinity of the edge of the tread part to the point Q is made to be large. Hence, as shown in FIG. 4, the ply tension at the position (a position S in the drawing) from the vicinity of the edge of the tread part to the point Q increases. Thus, a decrease in the traverse stiffness is suppressed, and thereby, deterioration of the operation stability can also be suppressed.

Additionally, assume a case where positions on the line segment SW, with a length of 80% of the line segment SW in between, and taking the tire equator line CL as the center in between indicate points K, and where the line segment extending parallel with the tire equator line CL from the tread surface to the straight line M indicates the line segment SH. In such a case, the length of the line segment extending, through the points K, in parallel with the tire equator line CL from the tread surface to the straight line M, is 85% or less of the length of the line segment SH.

Here, the line segment extending through the points K, in parallel with the tire equator line CL from the tread surface to the straight line M, is indicated as PH in the drawing.

Incidentally, the length of PH is preferably 60% or more of the length of the line segment SH. If the length of PH is shorter than 60% of the length of the line segment SH, the air volume of the tire decreases, which leads to a problem that the durability is deteriorated.

Furthermore, the outer contour line of the tire and the inner contour line of the tire in a region from the tire equator line CL to each point B are approximately parallel with the line segment SW.

Here, being approximately parallel means that an angle of each of the outer contour line and the inner contour line in relation to the line segment SW is within a range of ±10°.

Moreover, in an upper region 6, which is a region between the outer contour line and the inner contour line, a difference in length in the radial direction of the tire between the position where the length in the radial direction of the tire is longest and the position where the length in the radial direction of the tire is shortest is 50% or less of the length from the shortest belt layer 3a to the tread surface on the tire equator line CL.

Incidentally, in the upper region 6, the difference in length in the radial direction of the tire between the position where the length in the radial direction of the tire is longest and the position where the length in the radial direction of the tire is able to achieve a good balance between the rolling resistance and the wear resistance. Hence, it is preferable that the difference be 15 to 35% or more of the length from the shortest belt layer 3a to the tread surface on the tire equator line CL.

Please note that although various values are specified in the pneumatic tire of the embodiment, these are simply preferable numeric values, and it is sufficient as long as the angle θ in the drawing is 50° or larger.

Second Embodiment

Descriptions will be given below of a pneumatic tire 1 according to a second embodiment.

Figure 5:
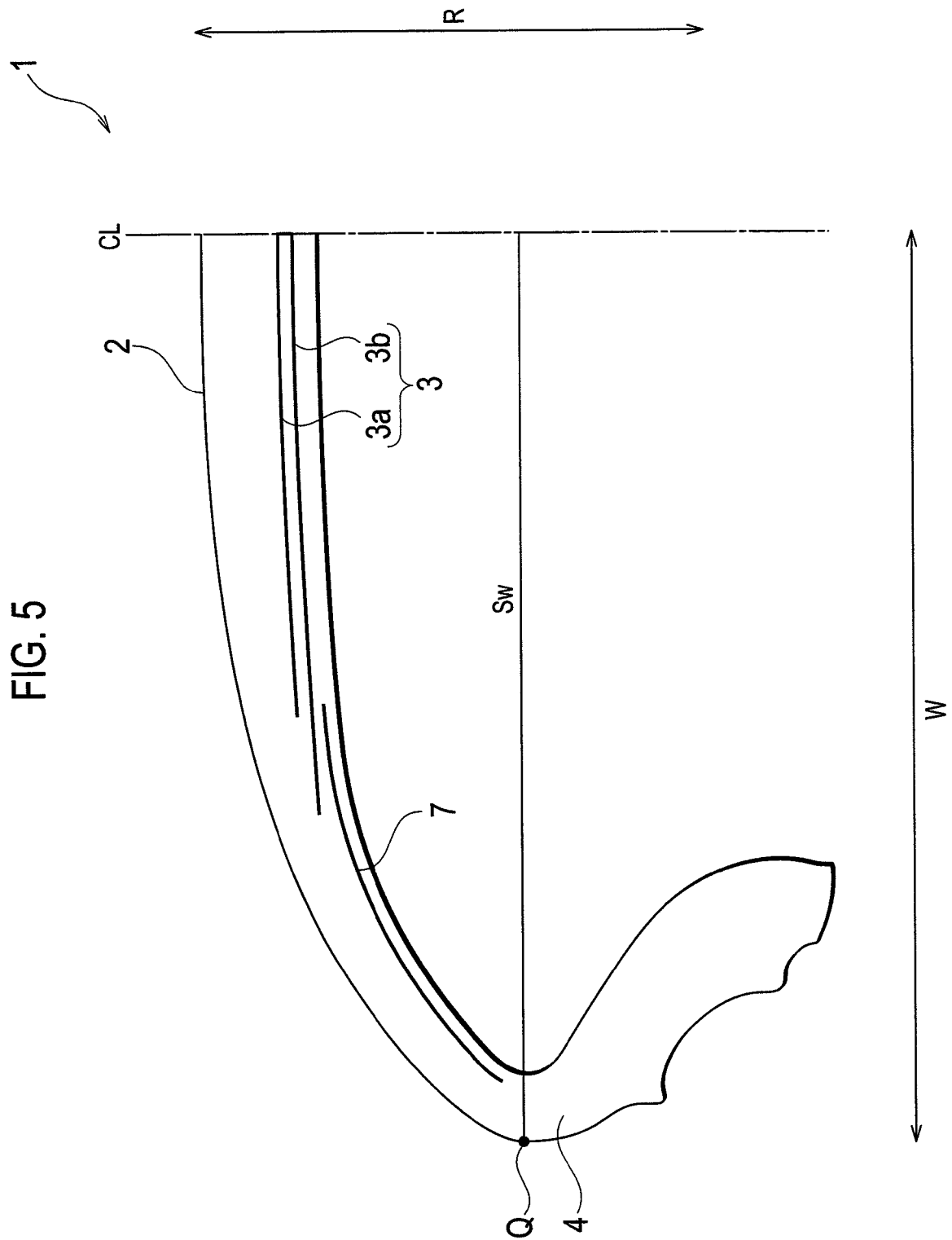
FIG. 5 is a cross-sectional view showing a pneumatic tire according to a second embodiment of the present invention.

FIG. 5 is a cross-sectional view showing the pneumatic tire 1 according to this embodiment. Please note that the drawing shows only one side of the tire from a tire equator line CL in the pneumatic tire 1.

As shown in the drawing, the pneumatic tire 1 includes a tread part 2, belt layers 3, sidewall parts 4, and reinforcing layers 7.

Since the descriptions of the tread part 2, the belt layers 3 and the sidewall parts 4 overlap with those in the first embodiment, descriptions thereof will be omitted.

In the cross section, each reinforcing layer 7 extends from a position in the inner side in the tire width direction than an edge of a longest belt layer 3b to the vicinity of a line segment SW, and is disposed on the inner side in the radial direction of the tire than the belt layers 3 on the innermost side in the radial direction of the tire. Here, each of the reinforcing layers 7 is for reinforcing the portion from the ends of the tread part 2 to the sidewall parts 4.

Since the line segment SW is the same as the one in the first embodiment, a description thereof will be omitted.

Here, the vicinity of the line segment SW indicates the region within a range of 10 mm from the line segment SW in the radial direction of the tire.

Third Embodiment

Descriptions will be given below of a pneumatic tire 1 according to a third embodiment.

The pneumatic tire 1 includes a tread part 2, belt layers 3, and sidewall parts 4.

Since the descriptions of the tread part 2, the belt layers 3 and the sidewall parts 4 overlap with those in the first embodiment, descriptions thereof will be omitted.

Figure 6:
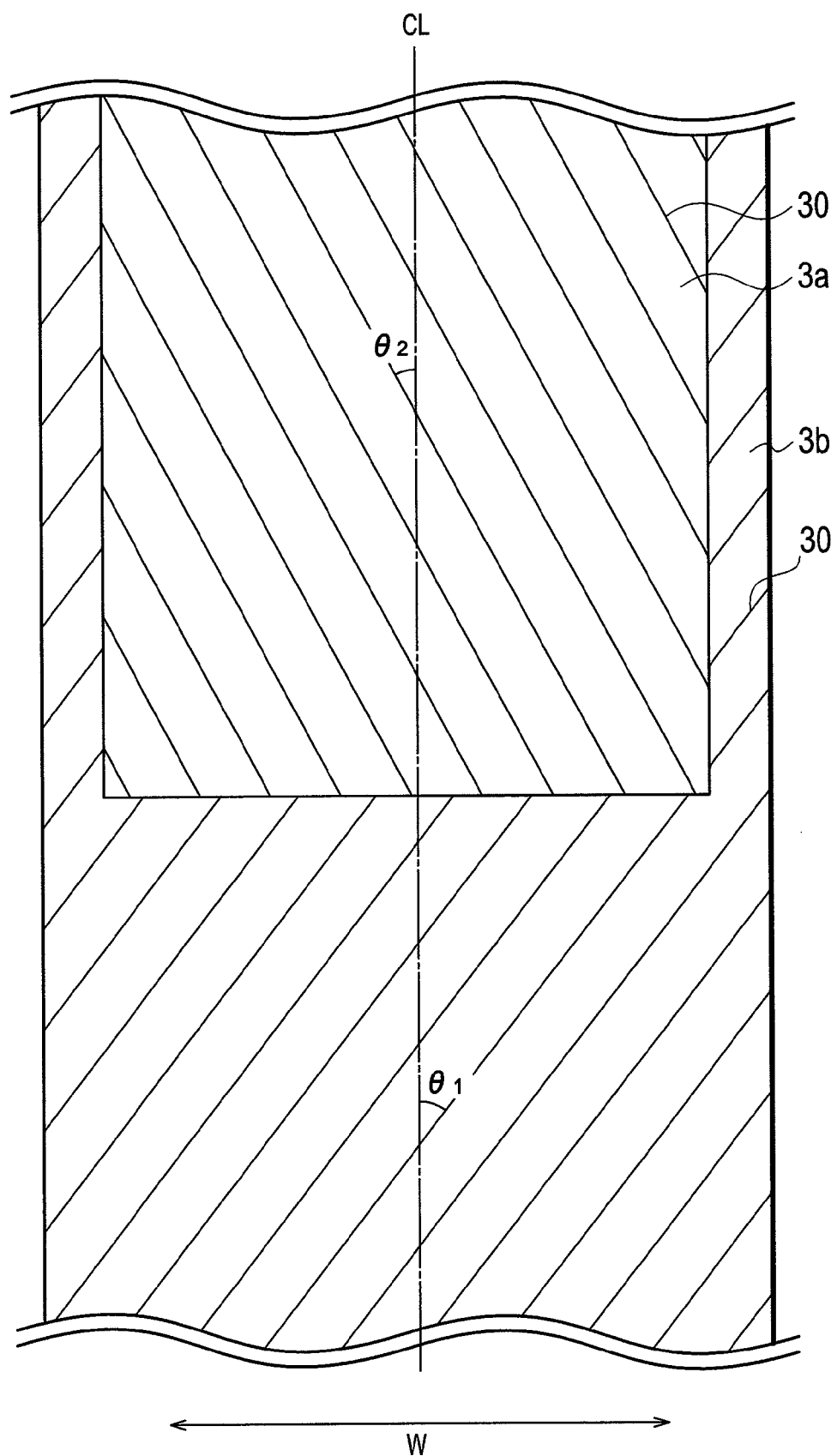
FIG. 6 is a view showing a belt layer according to a third embodiment of the present invention.

FIG. 6 is a view showing the belt layers 3 in this embodiment.

Assume a case where an acute angle formed by each cord 30 which forms a longest belt layer 3b, and which inclines in relation to a tire equator line CL, indicates an angle θ1, and where an acute angle formed by each cord 30 which forms a shortest belt layer 3a, and inclines in relation to the tire equator line CL indicates an angle θ2, in the cross section, as shown in the drawing. In such a case, the angle θ1 is larger than the angle θ2.

Furthermore, the cords 30 which form the shortest belt layer 3a and the cords 30 which form the longest belt layer 3b incline to the directions opposite to each other by having the tire equator line CL as the boundary.

Other Embodiments

As described above, the details of the present invention have been disclosed through the first to third embodiments of the present invention. However, the descriptions and drawings forming a part of the disclosure should not be understood to limit the present invention.

Specifically, although each of the first to third embodiments was described separately, the present invention is not limited thereto. The present invention may be formed by combining the first and second embodiments.

In addition, the first and third embodiments may be combined, or all of the first, second and third embodiments may be combined.

Various alternative embodiments, examples, and operation techniques can be obvious for those skilled in the art from the disclosure. Hence, the technical scope of the present invention is to be defined only by matters to define the invention according to the appended claims which are reasonably understood from the above description.

EXAMPLE

Figure 7:
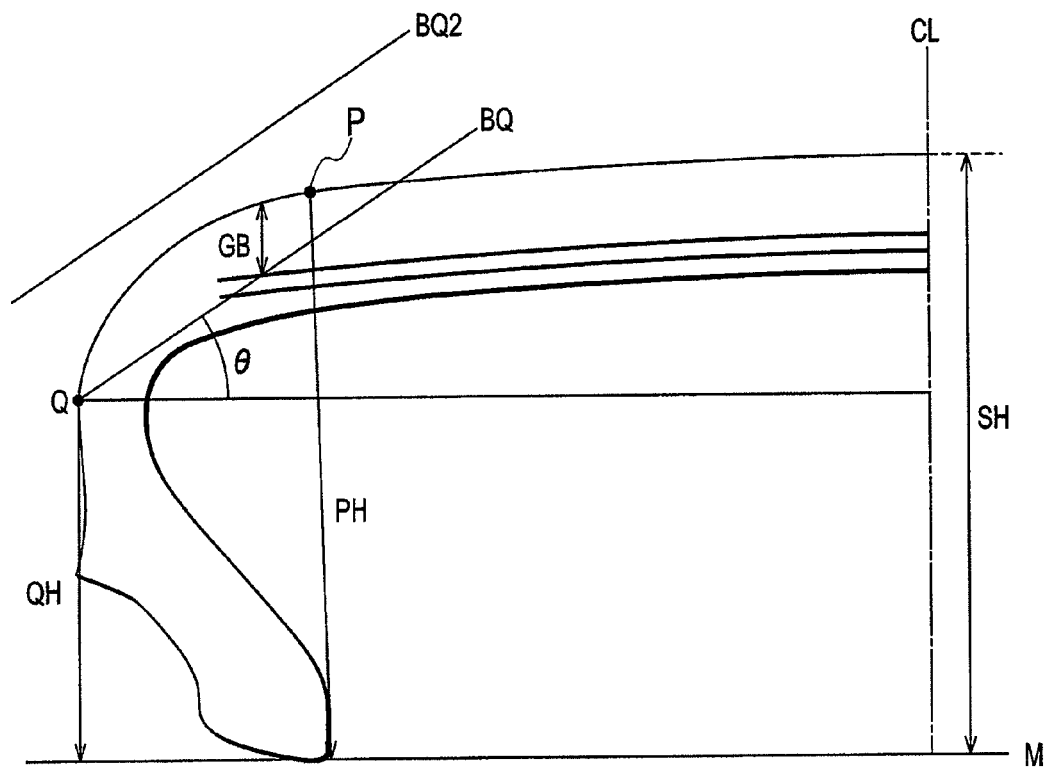
FIG. 7 is a cross-sectional view showing a pneumatic tire of a first comparative example of an example.

Next, descriptions will be given of the results of tests carried out by using pneumatic tires according to a comparative example and an example to which the present invention was applied, in order to make the effects of the present invention more clear. Please note that the data on the pneumatic tires was measured under the following conditions:

Tire size: 225/40ZR18
Internal pressure condition: 230 kPa
Load condition: 4.0 kN Here, as shown in FIG. 7, the pneumatic tire according to the comparative example was as follows: the angle θ was 53°; the length of PH was 90% of the length of a line segment SH; the length of QH was 57% of the length of the line segment SH; and the length of GB was 86% the length from the shortest belt layer to the tread surface on the tire equator line.

Moreover, as shown in FIG. 1, the pneumatic tire according to the example to which the present invention was applied was as follows: the angle θ was 35°; the length of PH was 77% of the length of the line segment SH; the length of QH was 46% the length of the line segment SH; and the length of GB was 70% of the length from the shortest belt layer to the tread surface on the tire equator line.

Table 1 shows the results of the rolling resistance, the wear resistance, and the durability of the pneumatic tires according to the comparative example and the example.

TABLE 1

|  | Rolling Resistance | Wear Resistance | Durability |
|---|---|---|---|
| Comparative Example 1 | 100 | 100 | 100 |
| Example 1 | 76 | 98 | 100 |

<Rolling Resistance>

Each of the pneumatic tires was mounted on a drum testing machine. The rolling resistance of the pneumatic tire according to the example was shown in an index, setting, at "100," the rolling resistance of the pneumatic tire according to the comparative in the case of running at a speed of 80 km/h. Here, it is indicated that the smaller the index is, the smaller rolling resistance the pneumatic tire has.

According to the result of this, the pneumatic tire according to the example was found to have less rolling resistance than the pneumatic tire according to the comparative example.

<Wear Resistance>

Each of the pneumatic tires was mounted on a drum testing machine. The wear resistance of the pneumatic tire according to the example was shown in an index, setting, at "100," the wear resistance of the pneumatic tire according to the comparative example after running 2000 km. Here, it is indicated that the larger the index is, the more excellent wear resistance the pneumatic tire has.

According to the result of this, the pneumatic tire according to the example was found to have nearly the same wear resistance as that of the pneumatic tire according to the comparative example.

<Durability>

Each of the pneumatic tires was mounted on a vehicle. The damage condition of each of the pneumatic tire was measured in a comprehensive manner after running 2000 km at a speed of 200 km/h, and then the durability of the pneumatic tire according to the example was shown in an index, setting, at "100," the durability of the pneumatic tire according to the comparative example. Here, it is shown that the larger the index is, the more excellent durability the pneumatic tire has.

According to the result of this, the pneumatic tire according to the example was found to have nearly the same durability as that of the pneumatic tire according to the comparative example.

INDUSTRIAL APPLICABILITY

With the aspects of the present invention, it is possible to reduce the rolling resistance without reducing the wear resistance and the durability.

The invention claimed is:

1. A pneumatic tire including a tread part contacting a road surface, at least two belt layers each formed of a plurality of parallel cords covered with rubber, and a pair of bead toes, the pneumatic tire characterized in that in the case where, in a cross section including the axis of rotation: the ends of a shortest belt layer, which is the shortest one, in length in a tire width direction, of the belt layers are set to be points B; points on a tire surface, between which the width of the tire is widest, are set to be points Q; a line segment connecting each point B and the corresponding one of the points Q is set to be a line segment BQ; and a line segment connecting the pair of points Q is set to be a line segment SW, an angle at which the line segment BQ and the line segment SW cross is 50° or smaller, wherein the angle at which the line segment BQ and the line segment SW cross is within a range of 20° to 40°, wherein in the case where, in the cross section: a line segment extending, parallel with the tire equator line, from the point B to the tread surface is set to be a line segment GB; and a line segment from the shortest belt layer to the tread surface on the tire equator line is set to be a line segment GA, the length of the line segment GB is 85% or less of the line segment GA, wherein, in the case where, in the cross section: a straight line extending parallel with the line segment SW through the bead toes is set to be a straight line M; and a line segment on the equator line extending, parallel with the tire equator line, from the tread surface to the straight line M is set to be a line segment SH, the length of the line segment extending, parallel with the tire equator line, from each point Q to the straight line M is 55% or less of the length of the line segment SH, and wherein, in the cross section, the outer contour line of the tire and the inner contour line of the tire in a region from the tire equator line to each point B are parallel with the line segment SW of within a range of ±10°.

2. The pneumatic tire according to claim 1, characterized in that in the case where, in the cross section, a straight line extending parallel with the line segment BQ with a distance, on the outer side in the radial direction of the tire, equal to the width in the radial direction of the tire on the tire equator line is set to be a straight line BQ2, the outer contour line of the tire is positioned in the inner side in the radial direction of the tire than the straight line BQ2.

3. The pneumatic tire according to claim 1, characterized in that the length of the line segment GB is 50% or more of the line segment GA.

4. The pneumatic tire according to claim 1, characterized in that in the case where, in the cross section: positions on the line segment SW, with a length of 80% of the line segment SW in between, and taking the tire equator line as the center in between, are set to be points K, the length of the line segment extending, through the points K, in parallel with the tire equator line, from the tread surface to the straight line M, is 85% or less of the length of the line segment SH.

5. The pneumatic tire according to claim 1, characterized in that, a difference in length in the radial direction of the tire between the position where the length in the radial direction of the tire is longest and the position where the length in the radial direction of the tire is shortest is 50% or less of the length from the shortest belt layer to the tread surface on the tire equator line, in a tread region which is a region between the outer contour line of the tire and the inner contour line of the tire.

6. The pneumatic tire according to claim 1, characterized by further comprising reinforcing layers each of which extends, in the cross section, to the line segment SW of within a range of ±10 mm, from a position in the inner side in the tire width direction than an edge of the longest one, in length in the tire width direction, of the belt layers, and each of which is disposed on the inner side in the radial direction of the tire than one of the belt layers on the innermost side in the radial direction of the tire.

7. The pneumatic tire according to claim 1, characterized in that in the case where, in the cross section: an acute angle at which the cords forming the longest one, in length in the tire width direction, of the belt layers incline in relation to the tire equator line is set to be an angle $\theta 1$; and an acute angle at which the cords forming the shortest belt layer incline in relation to the tire equator line is set to be an angle $\theta 2$, the angle $\theta 1$ is larger than the angle $\theta 2$.

* * * * *